United States Patent [19]

Prosenbauer

[11] Patent Number: 4,538,324
[45] Date of Patent: Sep. 3, 1985

[54] APPARATUS FOR SEPARATING MEAT FROM BONES

[75] Inventor: Otto Prosenbauer, Vienna, Austria

[73] Assignee: Inject Star Poekelmaschinen GmbH, Vienna, Austria

[21] Appl. No.: 612,824

[22] Filed: May 22, 1984

[51] Int. Cl.³ .............................................. A22C 25/16
[52] U.S. Cl. ........................................ 17/1 G; 17/46; 241/24
[58] Field of Search ............... 17/1 G, 46, 56; 241/24, 241/69, 74, 94

[56] References Cited

U.S. PATENT DOCUMENTS 4,077,089  3/1978  Dutaud ............................... 17/46 X

FOREIGN PATENT DOCUMENTS 2901909  7/1980  Fed. Rep. of Germany .......... 17/46
1563750  3/1980  United Kingdom ..................... 17/46
0878225 11/1981  U.S.S.R. .................................. 17/46

Primary Examiner—Willie G. Abercrombie
Attorney, Agent, or Firm—Townsend and Townsend

[57] ABSTRACT

An apparatus for severing the meat adhering on bones from these bones, in particular for poultry parts such as carcasses of chickens or turkeys, has a press comprising a press cavity into which the mass of meat and bones is introduced between a press piston and a counter-piston. The wall of the press cavity is, at least within the area of the counter-piston, formed of a perforated filter. The counter-piston has a closing section for a discharge opening for discharging the pressed bones from the press cavity and said closing section has a greater diameter than is the diameter of the press cavity and said counter-piston having a filter section equally formed of a perforated filter and having a smaller diameter than is the diameter of the press cavity. In closing position of the counter-piston, the filter section of the counter piston having over the length of its perforated filter the same external diameter is located at a distance from the wall, formed of a perforated filter, of the press cavity, so that an annular space is formed. The meat having been brought to a pasty condition under the action of the press pressure passes through the holes of the perforated filter forming the wall of the press cavity and through the holes of the perforated filter forming the filter section of the counter-piston, whereas the bones are retained. These bones are discharged during a movement of the counter-piston directed away from the press piston via the thus released discharge opening.

6 Claims, 6 Drawing Figures

APPARATUS FOR SEPARATING MEAT FROM BONES

BACKGROUND OF THE INVENTION

The invention refers to an apparatus for severing the meat adhering to bones from these bones, in particular for parts of poultry such as carcasses of chickens or turkeys, in which apparatus the mass of meat and bone is introduced into a press cavity of a press and is compressed there between a press piston and a counter-piston. Exit openings are, in this case, in the wall of the press cavity for allowing to pass therethrough the meat having been brought in a pasty condition under the action of the pressure within the press, whereas the bones are retained and discharged from the press cavity via a discharge opening being released by moving the counter-piston away from the pressure piston.

During the operation of such apparatuses there are frequently encountered masses to be pressed comprising up to 60% and in some cases even more meat. Of course, it is desired to recover such high amounts of meat as completely as possible, but it has been experienced that this is only insufficiently possible with the apparatuses. Particularly when pressing poultry parts, for example carcasses (these are poultry bodies from which the wing parts and the leg parts have been removed), the annular filters used up till now become clogged, in particular by the skin portions of the mass to be pressed. This results in a reduction of the yield until operation becomes impossible. It has been tried to combat this drawback by means of a counter-piston provided with a pointed end, because it could be assumed that in this manner the pressure will be increased which acts within the press cavity in radial direction on the mass to be pressed. It has, however, been found that the filter remains clogged so that the yield can not be brought to the desired value.

SUMMARY OF THE INVENTION

It is an object of the invention to avoid the mentioned drawbacks and to provide an apparatus for severing the meat from bones which allows to press the mass of meat and bones with low expenditure and in a substantially operation-safe manner.

It is also an object of the invention to provide an apparatus for severing the meat from the bones in which an optimum efficiency and a high yield in meat is obtained.

It is a further object of the invention to provide an apparatus for severing the meat from bones with which the severed meat can be carried away within a shorter time interval as with known apparatuses.

It is a further object of the invention to design an apparatus for severing the meat from bones such that clogging of the passages for carrying away the meat, in particular clogging of said passages by the skin of the animals, is prevented to a high degree.

It is a further object of the invention to provide an apparatus for severing the meat from bones which can easily be disassembled and cleaned and which can easily be assembled.

In the inventive apparatus for severing the meat from bones, also the counter-piston has a filter section provided with further passage openings for pasty meat, protruding in closing position of the counter-piston into the press cavity and having a smaller diameter than is the diameter of the press cavity, noting that both, the wall of the press cavity at least within the area of the counter-piston as well as the filter section of the counter-piston, are formed by a perforated filter and that the filter section of the counter-piston has the same external diameter over the length of its perforated filter. As has been found, the substantially circular bores of the perforated filters are less subject to become clogged by the skin than are the slots between adjacent rings of known filters composed of annular discs. Furthermore, meat is removed from the press cavity in inward direction via the filter section of the counter-piston. In this case the total axial length of this filter section is effective, because the material may arrive at all passage openings of the filter section via the annular space existing between this filter section and the internal wall of the press cavity. This substantially contributes to an increase of the yield.

According to a preferred embodiment of the invention, the filter section is composed of rings provided at the circumference with the passage openings, said passage openings opening into collecting passages provided within the rings and extending in axial and radial direction. The perforated filter can thus equally be composed of rings, but the passage openings of these rings are formed of bores within the ring mantle and not, as in usual ring filters, of slot-shaped openings delimited by the border surfaces of two adjacent rings. Preferably and according to the invention, each ring is slid with a central opening onto a mandrel, extending through the rings, of the counter-piston and maintained in position by an end plate fixed on the mandrel and forming the front surface of the counter-piston. Cleaning of the perforated filter formed of the rings is thus facilitated. Correct assembling is in this case facilitated if, according to a further development of the invention, all rings are of equal shape.

Preferably and according to the invention, at least the perforated filter arranged in the area of the counter-piston and forming the wall of the press cavity is formed of a thin-walled mantle perforated by rounded holes, which rounded holes are with their axes arranged along a plurality of circles being mutually staggered in direction of the axis of the perforated filter and being each in concentric relation to the axis of the perforated filter, noting that a circumferential reinforcing rib is provided on the outer mantle of the perforated filter between two such circles each. The reason therefor is that the perforations of the perforated filter frequently have a very small diameter of preferably between approximately 1.2 and 2.0 mm. Holes of such a diameter can, however, no more reliably or economically, respectively, be bored into thick-walled material. It is thus necessary to use a thin-walled material for the mantle for the perforated filter, which, however, results in the risk that the thin-walled mantle of the perforated filter can no more withstand the pressure generated during pressing operation. This risk is prevented by the reinforcing ribs. In this case it is convenient to design the perforated filter as one single part. It would, however, also be possible to assemble in the perforated filter correspondingly profiled rings approximately in the same manner as has been previously described in connection with the construction of the perforated filter of the counter-piston.

BRIEF DESCRIPTION OF THE DRAWINGS

In the annexed drawings, there is schematically shown an example of embodiment of the invention.

In the drawing

DETAILED DESCRIPTION OF THE DRAWINGS

Figure 1:
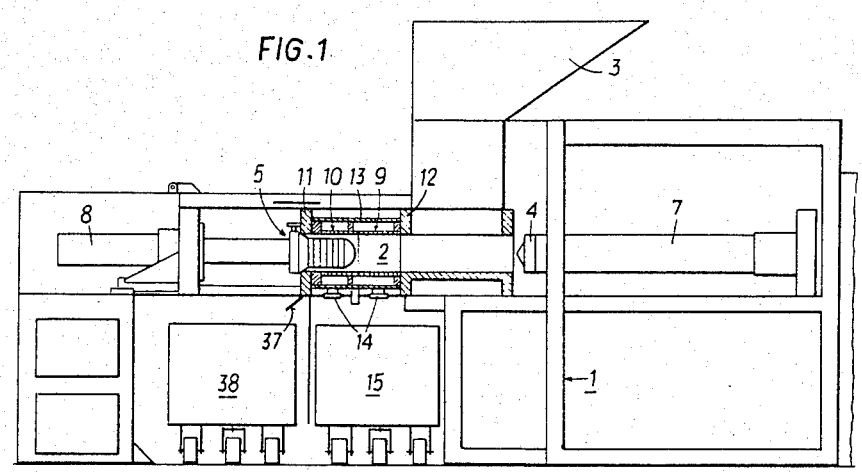
FIG. 1 shows a vertical section through the apparatus.
Figure 6:
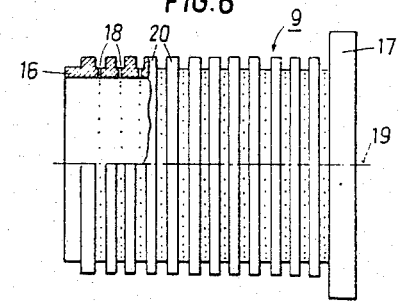
FIG. 6 shows an axial section through a perforated filter.

The apparatus according to FIG. 1 has a frame 1, in which a press cavity 2 is arranged with its axis extending in horizontal direction, said press cavity being charged with the mass of meat and bones to be pressed via a supply hopper 3. A press piston 4 and a counter-piston 5 are movable within the press cavity 2 in axial direction of the press cavity 2, said both pistons 4, 5 closing the press cavity 2 at both of its front ends. In the fully retracted position, the counter-piston 5 releases a discharge opening 6 for the pressed bones, the pressed parcel of bones being expelled through this discharge opening by the press piston 4. Said both pistons 4, 5 are, conveniently hydraulically, actuated by means of pressurized fluid cylinders 7 and 8, respectively, being mounted within the frame 1. In its fully retracted position, the press piston 4 releases the opening leading from the supply hopper 3 into the press cavity 2 to such an extend that the mass to be pressed and charged into the supply hopper 3 can enter the press cavity 2 in an unobstructed manner. The wall of the press cavity 2 is formed of two perforated filters 9, 10 arranged one behind the other and maintained in position between two stationary walls 11, 12 of the frame 1, one (10) of said filters being shown in FIG. 6 in an enlarged scale. Said both perforated filters 9, 10 are surrounded by a collecting cylinder 13 for the meat having been brought in a pasty condition under the action of the pressure prevailing within the press, said collecting cylinder being provided with connection pieces 14 for connecting thereto hoses via which the meat can be supplied into a container, for example a transport carriage 15.

The perforated filter 10 (FIG. 6) represents one single part and has a comparatively thin-walled mantle 16 which terminates in a connecting flange 17 at one front end of the perforated filter 10. The mantle 16 is perforated by a plurality of passage openings 18 through which the meat can pass having been brought in a pasty condition but which retain the bones. Each passage opening 18 is formed of a bore within the mantle 16, the diameters of the bores of the perforated filter 9 located in closer proximity to the supply hopper 3 being, however, somewhat greater, preferably within the range of about 1.5 to 2.0 mm, than the bores of the perforated filter 10 located more distant from the supply hopper and having a diameter between about 1.2 and about 1.5 mm. The passage openings 18 are arranged along several circles in concentric relation to the axis 19 of the respective perforated filter 9, 10, said circles having mutually equal distances one from the other. The passage openings 18 are distributed with mutually equal distances one from the other along each circle. Between each pair of two such circles there is arranged on the outer surface of the mantle 16 a circumferential rib 20 which reinforces the mantle such that it can withstand the pressure prevailing within the press cavity 2. This provides the required mechanical strength of the one-piece perforated filter 9 and 10, respectively.

Figure 2:
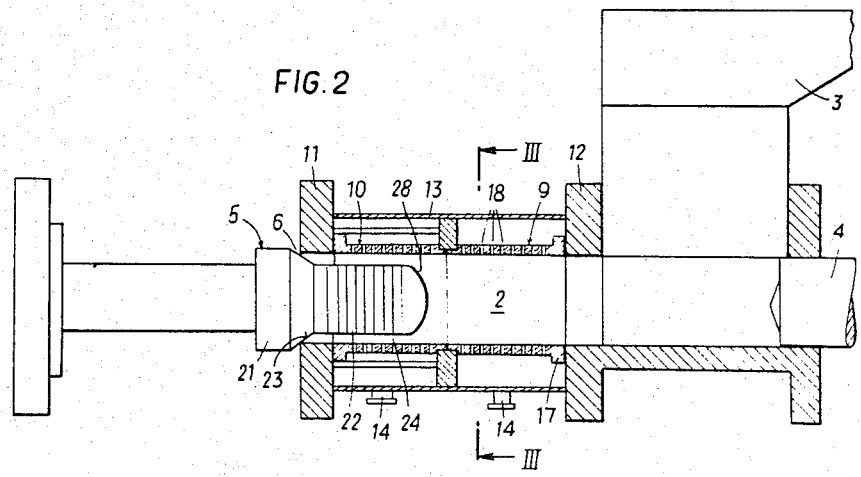
FIG. 2 shows in an enlarged scale a vertical section through the press cavity together with both pistons.
Figure 3:
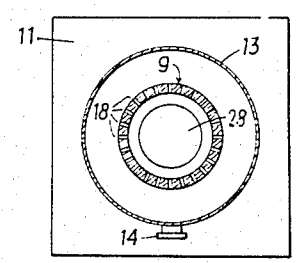
FIG. 3 is a section along the line III—III of FIG. 2.
Figure 4:
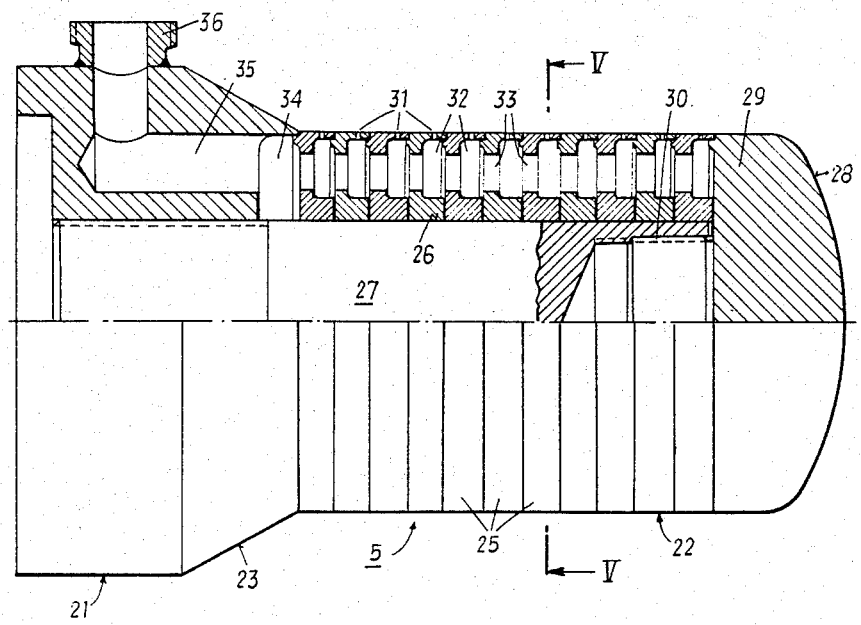
FIG. 4 shows in a greater scale the construction of the counter-piston in an axial section.
Figure 5:
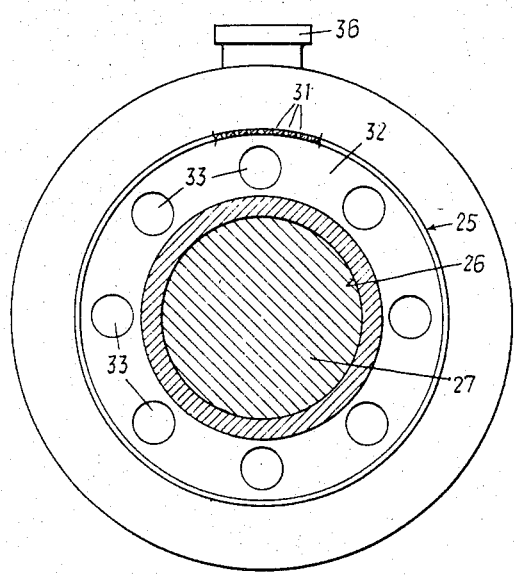
FIG. 5 is a section along the line V—V of FIG. 4

The counter-piston 5 (FIGS. 4, 5) has two sections, i.e. a closing section 21 and a filter section 22, which are in connection one with the other via a conical surface 23. This conical surface 23 forms like a valve cone a closure member for the discharge opening 6, if the counter-piston 5 arrives the extreme right hand position of FIG. 2. In this position the filter section 22 extends into the press cavity 2 to such an extent that the filter section 22 nearly covers the total axial length of the surrounding perforated filter 10 within the wall of the press cavity. The filter section 22 is, however, kept at a distance from this press cavity wall by an annular space 24 formed on account of the outer diameter of the filter section 22 always being smaller than the diameter 6 of the press cavity 2. This filter section 22 is designed as a perforated filter composed of a plurality of rings 25 (FIGS. 4, 5) being shifted with a central opening 26 onto a mandrel 27 extending through all rings 25 and being screwed into the closing section 21 of the counter-piston 5. The rings 25 are maintained in position on this mandrel 27 by means of an end plate 29 forming the bomb-shaped front surface 28 of the counter-piston 5 and being threaded into the front end of the mandrel 27 by means of a thread 30. Each ring 25 has on its circumference a plurality of radial passage openings 31 for the meat having been brought in a pasty condition, noting that the diameter and the design of said openings 31 can be the same as that of the passage openings 18 of the perforated filter 10. The passage openings 31 open into collecting passages 32 spared within the rings and extending in circumferential direction thereof and being connected one with the other by collecting passages 33 extending in axial direction and being formed of holes provided in the annular wall. All collecting passages 33 open into a collecting space 34 located between the last ring and the closing section 21 and having connected thereto a discharge passage 35 provided within the closing section 21 and to which a hose not shown can be connected by means of a fitting 36 for conveying via said hose the obtained pasty mass of meat into the transport carriage 15.

For preventing any rotation of the rings 25 around the axis of the mandrel 27, the mandrel 27 conveniently has a wedge-like protrusion extending in longitudinal direction of the mandrel and engaging correspondingly shaped centering grooves of the rings. The rings can thus only in a predetermined position be shifted onto the mandrel. Conveniently, all rings 25 are of equal size and of equal shape so that it is of no importance in which sequence the rings are slid onto the mandrel 27. Assembling errors are thus avoided.

Below the discharge opening 6, there is provided a chute 37 via which the parcel of pressed bones expelled by the press piston 4 through the discharge opening 6 falls into a further transport carriage 38.

When operating the apparatus, the mass to be pressed, for example carcasses of chickens or turkeys, are introduced into the press cavity 2 via the supply hopper 3, the press piston 4 being fully retracted and the counter-piston 5 being brought in its position closing the discharge opening 6. After having filled the press cavity 2, the press piston 4 is advanced in direction to the counter-piston 5. Under the action of the pressure thus built up within the press cavity 2, the meat adhering on the bones is brought into the pasty condition and can thus emerge from the press cavity 2 through the passage openings 18 of the perforated filters 9, 10 as well as through the passage openings 31 of the filter section 22 of the counter-piston 5. After having terminated the pressing operation, the counter-piston 6 is retracted and the remaining parcel of residues is expelled through the discharge opening 6 by further advancing the press piston 4. The procedure can, however, also be such that, after having pressed the first charge, the counter-piston 5 is maintained in its closing position and the press piston 4 is retracted to such an extent that the further charge can be introduced into the press cavity via the supply hopper 3. This second charge can then be pressed together with the residue of the first charge. This procedure can be repeated several times, noting that with each charge the cake of residues accumulated in front of the counter-piston 5 becomes greater. After having terminated these procedures, the collected residue is expelled in the previously described manner.

What is claimed is:

1. Apparatus for severing the meat from bones by pressing the mass of meat and bones introduced into the cylindrical press cavity of a press between a press piston and a counter-piston, said apparatus comprising passage openings within the wall of the press cavity, through which openings the meat can pass having been brought into the pasty condition under the action of the press pressure, whereas the bones are retained, noting that both pistons can be moved in axial direction of the press cavity and that the counter-piston releases during its movement directed away from the press piston a discharge opening for discharging the pressed bones from the press cavity, further noting that the counter-piston has a closing section of greater diameter than the diameter of the press cavity and a filter section, provided with further passage openings for pasty meat, of smaller diameter than the diameter of the press cavity, said filter section extending in closing position of the counter-piston into the press cavity and being, however, separated from the wall of the press cavity by an annular space, and further noting that the wall of the press cavity is formed at least within the area of the counter-piston by a perforated filter and that also the filter section of the counter-piston forms a perforated filter and that this filter section has the same outer diameter over the length of its perforated filter.

2. Apparatus as claimed in claim 1, wherein the filter section is composed of rings having on its circumference passage openings opening into collecting passages provided within the rings and extending in tangential and radial direction.

3. Apparatus as claimed in claim 2, wherein each ring is, with a central opening, put onto a mandrel of the counter-piston extending through the rings, all rings being maintained in position by means of an end plate forming the front surface of the counter-piston and being fixed on the mandrel.

4. Apparatus as claimed in claim 2, wherein all rings are of equal shape.

5. Apparatus as claimed in claim 1, wherein at least one perforated filter consists of a thin-walled mantle perforated by rounded holes being arranged with their axes along a plurality of circles staggered one relative to the other in direction of the axis of the perforated filter, each of said circles being concentrically located relative to the axis of the perforated filter and a circumferential reinforcing rib being arranged between each two such circles on the outer surface of the mantle.

6. Apparatus as claimed in claim 5, wherein the perforated filter is a one-piece part.

* * * * *